US008620088B2

(12) United States Patent
Lee (10) Patent No.: US 8,620,088 B2
(45) Date of Patent: Dec. 31, 2013

(54) METHODS AND APPARATUS TO COUNT PEOPLE IN IMAGES (75) Inventor: Morris Lee, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1 day.

(21) Appl. No.: 13/222,084

(22) Filed: Aug. 31, 2011

(65) Prior Publication Data

US 2013/0051677 A1 Feb. 28, 2013

(51) Int. Cl.
G06K 9/46 (2006.01)

(52) U.S. Cl.
USPC .......................................... 382/192; 382/203

(58) Field of Classification Search
None
See application file for complete search history.

(56) References Cited

U.S. PATENT DOCUMENTS

| | | | |
|---|---|---|---|
| 3,805,238 A | 4/1974 | Rothfjell | |
| 4,303,851 A | 12/1981 | Mottier | |
| 4,356,387 A | 10/1982 | Tsubota et al. | |
| 4,468,807 A | 8/1984 | Moulton | |
| 4,611,347 A | 9/1986 | Netravali et al. | |
| 4,644,509 A | 2/1987 | Kiewit et al. | |
| 4,769,697 A | 9/1988 | Gilley et al. | |
| 4,843,631 A | 6/1989 | Steinpichler et al. | |
| 4,849,737 A | 7/1989 | Kirihata et al. | |
| 4,858,000 A | 8/1989 | Lu | |
| 4,993,049 A | 2/1991 | Cupps | |
| 5,031,228 A | 7/1991 | Lu | |
| 5,063,603 A | 11/1991 | Burt | |
| 5,067,160 A | 11/1991 | Omata et al. | |
| 5,097,328 A | 3/1992 | Boyette | |
| 5,099,324 A | 3/1992 | Abe | |
| 5,121,201 A | 6/1992 | Seki | |
| 5,164,992 A | 11/1992 | Turk et al. | |
| 5,229,764 A | 7/1993 | Matchett et al. | |
| 5,384,716 A | 1/1995 | Araki et al. | |
| 5,412,738 A | 5/1995 | Brunelli et al. | |
| 5,481,622 A | 1/1996 | Gerhardt et al. | |
| 5,550,928 A | 8/1996 | Lu et al. | |
| 5,629,752 A | 5/1997 | Kinjo | |
| 5,675,663 A | 10/1997 | Koerner et al. | |
| 5,715,325 A | 2/1998 | Bang et al. | |
| 5,719,951 A | 2/1998 | Shackleton et al. | |

(Continued)

FOREIGN PATENT DOCUMENTS

| | | |
|---|---|---|
| JP | 2005234947 A | 9/2005 |
| JP | 2006254274 A2 | 9/2006 |
| JP | 2009205392 A | 9/2009 |
| JP | 2011070629 A | 4/2011 |
| WO | 96/05571 | 2/1996 |
| WO | 99/27668 | 6/1999 |
| WO | 2004/054255 | 6/2004 |

OTHER PUBLICATIONS

IP Australia, "Patent Examination Report No. 1," issued in connection with Australian Application No. 2012216312, Jul. 3, 2013, 3 pages.

(Continued)

Primary Examiner — Samir Ahmed
Assistant Examiner — Siamak Harandi
(74) Attorney, Agent, or Firm — Hanley, Flight & Zimmerman, LLC (57) ABSTRACT Methods, articles of manufacture, and apparatus to count people in an image are disclosed. An example method includes capturing an image of a body region in a first frame; and when a second frame different from the first frame includes the image of the body region, incrementing a first count of persons in the second frame.

18 Claims, 9 Drawing Sheets

(56) References Cited

U.S. PATENT DOCUMENTS

| | | | |
|---|---|---|---|
| 5,771,307 | A | 6/1998 | Lu et al. |
| 5,781,650 | A | 7/1998 | Lobo et al. |
| 5,793,409 | A | 8/1998 | Tetsumura |
| 5,801,763 | A | 9/1998 | Suzuki |
| 5,805,745 | A | 9/1998 | Graf |
| 5,835,616 | A | 11/1998 | Lobo et al. |
| 5,850,470 | A | 12/1998 | Kung et al. |
| 5,859,921 | A | 1/1999 | Suzuki |
| 5,864,630 | A | 1/1999 | Cosatto et al. |
| 5,878,156 | A | 3/1999 | Okumura |
| 5,892,837 | A | 4/1999 | Luo et al. |
| 5,901,244 | A | 5/1999 | Souma et al. |
| 5,920,641 | A | 7/1999 | Ueberreiter et al. |
| 5,963,670 | A | 10/1999 | Lipson et al. |
| 5,978,507 | A | 11/1999 | Shackleton et al. |
| 5,987,154 | A | 11/1999 | Gibbon et al. |
| 6,032,106 | A | 2/2000 | Ishii |
| 6,047,134 | A | 4/2000 | Sekine et al. |
| 6,055,323 | A | 4/2000 | Okumura |
| 6,144,797 | A | 11/2000 | MacCormack et al. |
| 6,332,033 | B1 | 12/2001 | Qian |
| 6,332,038 | B1 | 12/2001 | Funayama et al. |
| 6,363,159 | B1 | 3/2002 | Rhoads |
| 6,507,391 | B2 | 1/2003 | Riley et al. |
| 6,625,316 | B1 | 9/2003 | Maeda |
| 6,697,104 | B1 | 2/2004 | Yakobi et al. |
| 6,940,545 | B1 | 9/2005 | Ray et al. |
| 6,944,319 | B1 | 9/2005 | Huang et al. |
| 7,035,467 | B2 | 4/2006 | Nicponski |
| 7,158,177 | B2 | 1/2007 | Kage et al. |
| 7,203,338 | B2 * | 4/2007 | Ramaswamy et al. ........ 382/103 |
| 7,305,106 | B2 | 12/2007 | Sumitomo et al. |
| 7,321,668 | B2 | 1/2008 | Horie et al. |
| 7,466,844 | B2 | 12/2008 | Ramaswamy et al. |
| 7,612,796 | B2 | 11/2009 | Lev-Ran et al. |
| 7,692,684 | B2 * | 4/2010 | Ku et al. ........................ 348/169 |
| 7,912,245 | B2 | 3/2011 | Steinberg et al. |
| 2003/0033600 | A1 | 2/2003 | Cliff et al. |
| 2005/0198661 | A1 | 9/2005 | Collins et al. |
| 2006/0093185 | A1 * | 5/2006 | Kato et al. .................... 382/103 |
| 2009/0087039 | A1 * | 4/2009 | Matsuura ...................... 382/118 |
| 2011/0150273 | A1 | 6/2011 | Moore |
| 2011/0150280 | A1 | 6/2011 | Tsuji |
| 2011/0150283 | A1 | 6/2011 | Kim et al. |

OTHER PUBLICATIONS

Duda and Hart, "Bayes Decision Theory", Pattern Classification & Scene Analysis, pp. 10-43, Wiley Publishers, 1973.

International Preliminary Examination Report corresponding to International Application No. PCT/US2002/039625, Apr. 27, 2004, 4 pages.

Qing et al. "Histogram Based Fuzzy C—Mean Algorithm for Image Segmentation," Pattern Recognition, 1992. vol. III. Conference C: Image, Speech and Signal Analysis, Proceedings., 11th IAPR International Conference, Aug. 30-Sep. 2, 1992.

Wolfram, Stephen, "Mathematica A System for Doing Mathematics by Computer", 2d Ed., Addison-Wesley Publishing Company, Inc., 1991, pp. 665-666.

"Convex Hull", http://www.cse.unsw.edu.au/—lambert/java/3d/ConvexHull.html, downloaded Nov. 6, 2002.

"What is convex hull? What is the convex hull problem?," http://www.ifor.math.ethz.ch/ ~fukuda/polyfaq/node13.html, downloaded Nov. 6, 2002.

"1.6.2 Convex Hull," http://www.cs.sunysb.edu/~algorith/files/convex-hull.shtml, downloaded Nov. 6, 2002.

International Search Report corresponding to International Application No. PCT/US2002/039625, Jun. 20, 2003, 5 pages.

International Search Report corresponding to International Application No. PCT/US2002/39619, Mar. 11, 2003.

Written Opinion of the International Preliminary Examining Authority corresponding to International Application No. PCT/US2002/39619, Apr. 20, 2004.

Written Opinion of the International Preliminary Examining Authority corresponding to International Application No. PCT/US2002/39619, Aug. 22, 2003.

International Preliminary Examination Report corresponding to International Application No. PCT/US2002/39619, Jun. 1, 2004.

New Scientist Print Edition, "Hot Shopping," Mar. 18, 2000, 1 page, www.newscientist.com/article.ns? id=mg16522301.700 &print=true.

IBM Exploratory Computer Vision Group, "Infrared Person Tracking," Jun. 12, 2002, 2 pages, www.research.ibm.com/ecvg/misc/footprint.html.

Japan Patent Office, "Notice of Reasons for Rejection," issued in connection with Japanese Application No. P2012-190452, Aug. 13, 2013, 8 pages.

European Patent Office, "Extended European Search Report," issued in connection with Application No. 12006192.4, Jul. 18, 2013, 7 pages.

Song et al., "Combined Face-body Tracking in Indoor Environment," 2004, 4 pages, Proceedings of the 17th International Conference on Pattern Recognition, Institute for Robotics and Intelligent Systems, Los Angeles, CA.

* cited by examiner

METHODS AND APPARATUS TO COUNT PEOPLE IN IMAGES

FIELD OF THE DISCLOSURE

This disclosure relates generally for audience measurement and, more particularly, to methods and apparatus to count people in images.

BACKGROUND

Audience measurement of media content (e.g., broadcast television and/or radio, stored audio and/or video content played back from a memory such as a digital video recorder or a digital video disc, audio and/or video content played via the Internet, video games, etc.) often involves collection of content identifying data (e.g., signature(s), fingerprint(s), embedded code(s), channel information, time of consumption information, etc.) and people data (e.g., identifiers, demographic data associated with audience members, etc.). The content identifying data and the people data can be combined to generate, for example, media exposure data indicative of amount(s) and/or type(s) of people that were exposed to specific piece(s) of media content.

In some audience measurement systems, the collected people data includes an amount of people being exposed to media content. To calculate the amount of people being exposed to the media content, some measurement systems capture a series of images of a media exposure environment (e.g., a television room, a family room, a living room, etc.) and analyze the images to determine how many people appear in the images at a particular date and time. The calculated amount of people in the media exposure environment can be correlated with media content being presented at the particular date and time to provide exposure data (e.g., ratings data) for that media content.

DETAILED DESCRIPTION

To count people in a media exposure environment, such as a room of house in which a television is located, some audience measurement systems attempt to recognize objects as humans in a series of captured images of the room. A tally is maintained for each frame of image data to reflect an amount of people in the room at a time corresponding to a respective frame. That is, each recognition of an object as a human in a frame increases the tally associated with that frame. Some such systems recognize humans by recognizing human faces. However, faces of people often become unrecognizable due to, for example, partial visibility, obscuring of the face due to eating or drinking, or a rotation of a head relative to a camera capturing the frames. As a result, the tally for a frame including one or more unrecognized faces is less likely to accurately reflect the amount of people in the frame and, thus, the media exposure environment.

An inaccurate tally of the people in the frame and, thus, in the media exposure environment negatively affects the accuracy of media exposure data generated using the tally. For example, the audience measurement system counting the people in the room may also be collecting content identifying information to identify media content being presented (e.g., aurally and/or visually) in the room. With the identification of the media content and the amount of people in the room at a given date and time, the audience measurement system is aware of how many people were exposed to the specific media content. When face(s) are not recognized as faces, the exposure data for the specific media content may be undercut (e.g., the media content is accredited with less viewers/listeners than had actually been exposed to the media content).

To increase the accuracy of the people counts and, thus, media exposure data generated based on the people counts, example methods and apparatus disclosed herein utilize the relative stability of a body region, such as a shoulder region, of a person when, for example, the person tilts or rotates his or her head or when the face of a person becomes unrecognizable (e.g., because something is blocking the face from being captured by a camera). Often, a position or an orientation of a body region does not substantially change when a person tilts or rotates his or her head. For example, a position of a shoulder region of a person does not substantially change when a corresponding head is rotated or tilted. To take advantage of the stability of the shoulders during a head tilt or rotation, example methods, articles of manufacture, and apparatus disclosed herein capture an image of the shoulder region of a person when a face is recognized. That is, when an object is recognized as a face, example methods, articles of manufacture and apparatus disclosed herein capture and store a picture and a position (e.g., an X-Y coordinate within the frame) of one or more body regions of the corresponding person. Example methods, articles of manufacture and apparatus disclosed herein then determine whether the body region(s) are still present at the recorded position in one or more subsequent frames captured at a later time. Additionally or alternatively, example methods, articles of manufacture and apparatus disclosed herein can determine whether the body region(s) are present at the recorded position in one or more earlier frames captured previously. If the body region(s) appear in the previous or subsequent frame(s) at the recorded position, example methods, articles of manufacture, and apparatus disclosed herein count the person as present in the frame (e.g., by incrementing a tally for the previous or subsequent frame) even when the corresponding face is not recognized in the previous or subsequent frame. Thus, even when a face that is actually present in the previous or subsequent frame goes unrecognized due to, for example, a tilt or rotation of the corresponding head, example methods, articles of manufacture, and apparatus disclosed herein accurately include the person whose body region(s) are identified in the tally of people of the previous or subsequent frame. Additional and/or alternative aspects and/or advantages of example methods, articles of manufacture, and apparatus disclosed herein are described below.

Figure 1:
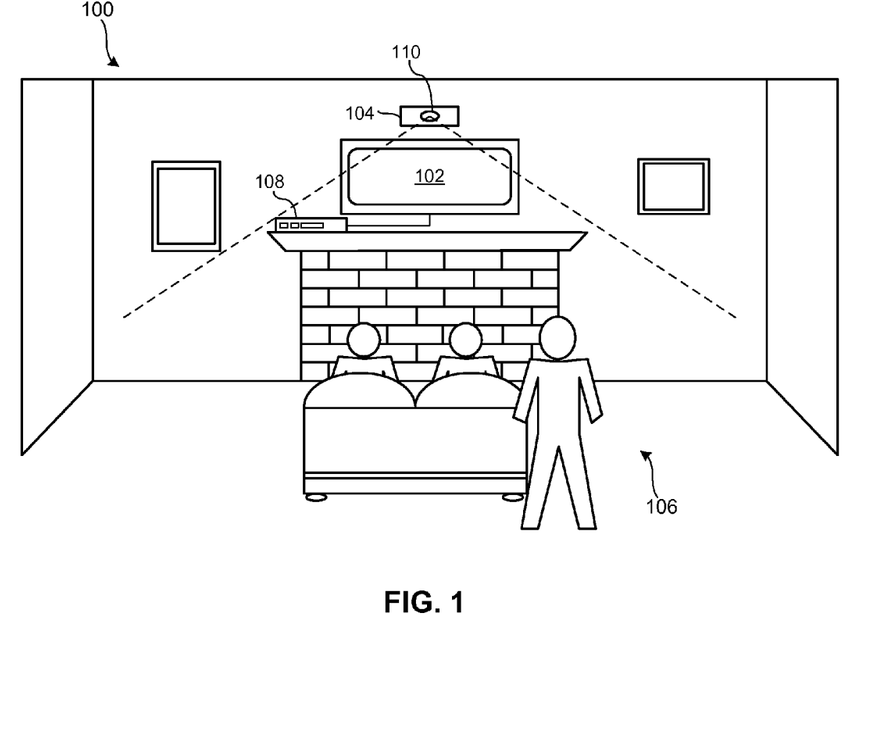
FIG. 1 is an illustration of an example exposure environment including an example audience measurement device disclosed herein.

FIG. 1 is an illustration of an example media exposure environment 100 including a media presentation device 102 and an example audience measurement device 104 for measuring an audience 106 of the media presentation device 102. In the illustrated example of FIG. 1, the media exposure environment 100 is a room of a household that has been statistically selected to develop television ratings data for a population/demographic of interest. The example audience measurement device 104 can be implemented in additional and/or alternative types of environments such as, for example, a room in a non-statistically selected household, a theater, a restaurant, a tavern, a retail location, an arena, etc. In the illustrated example of FIG. 1, the media presentation device is a television 102 coupled to a set-top box (STB) 108 that implements a digital video recorder (DVR) and a digital versatile disc (DVD) player. The example audience measurement device 104 can be implemented in connection with additional and/or alternative types of media presentation devices such as, for example, a radio, a computer monitor, and/or any other communication device able to present content to one or more individuals.

The example audience measurement device 104 of FIG. 1 utilizes a camera 110 to capture a plurality of time stamped frames of image data of the environment 100. The camera 110 of FIG. 1 captures images within a field of view defined by the dotted lines. In the example shown in FIG. 1, an image captured by the camera 110 includes each member of a three-person audience 106. Therefore, an accurate people tally for a frame corresponding to the state of the environment 100 shown in FIG. 1 will include three (3) people. As described in detail below, the example audience measurement device 104 of FIG. 1 also monitors the environment 100 to identify media content being presented (e.g., displayed, played, etc.) by the television 102 and/or other media presentation devices to which the audience 106 is exposed. Identification(s) of media content to which the audience 106 is exposed are correlated with the people tallies to generate exposure data for the media content. Therefore, the accuracy of the exposure data depends on the ability of the audience measurement device 104 to accurately identify the amount of people in the audience 106 as three (3).

Figure 2:
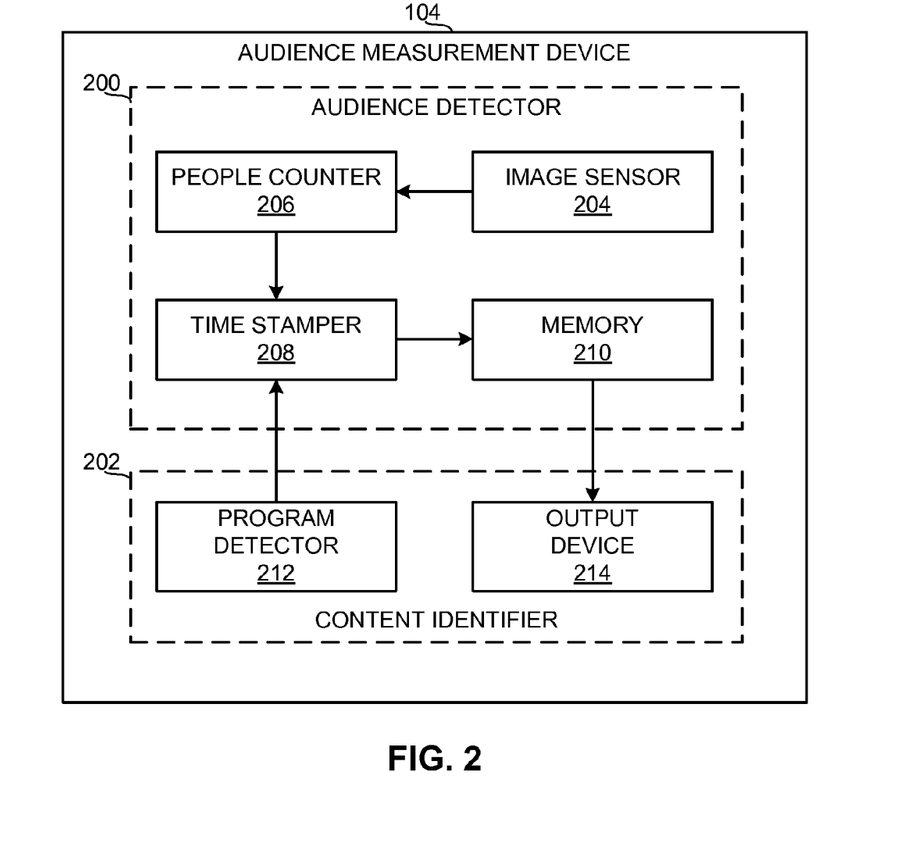
FIG. 2 is a block diagram of an example implementation of the example audience measurement device of FIG. 1.

FIG. 2 is a block diagram of an example implementation of the example audience measurement device 104 of FIG. 1. The example audience measurement device 104 of FIG. 2 includes an audience detector 200 and a content identifier 202. The example audience detector 200 includes an image sensor 204, a people counter 206, a time stamper 208, and a memory 210. The example image sensor 204 of FIG. 2 captures frames of image data of the environment 100, which includes the audience 106 being exposed to a presentation output by the media presentation device 102 of FIG. 1. In some examples, the image sensor 204 only captures frames of image data when the media presentation device 102 is in an "on" state and/or when the content identifier 202 determines that media content is being presented in the environment 100 of FIG. 1. The image sensor 204 may be implemented as any suitable device such as, for example, an infrared imager or a digital camera, such as a charge-coupled device (CCD) camera.

The frames obtained by the image sensor 204 of FIG. 2 are conveyed to the people counter 206. In the illustrated example of FIG. 2, the people counter 206 determines how many people appear in each of the received frames and records each of the amounts of people as a tally for each frame. The manner in which the example people counter 206 performs its operations is described in detail below in connection with FIGS. 3-5.

The example people counter 206 of FIG. 2 outputs the calculated tallies along with the corresponding frames to the time stamper 208. The time stamper 208 of the illustrated example includes a clock and a calendar. The example time stamper 208 associates a time and date with each calculated tally and the corresponding frame by, for example, appending the time/date data to the end of the tally data and/or the image data. A data package (e.g., the tally, the date and time, and the frame) is stored in the memory 210. The memory 210 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The memory 210 may also include one or more mass storage devices such as, for example, hard drive disk(s), compact disk drive(s), digital versatile disk drive(s), etc.

The example content identifier 202 of FIG. 2 includes a program detector 212 and an output device 214. The example program detector 212 of FIG. 2 detects presentation(s) of media content in the media exposure environment 100 and collects identification information associated with the detected presentation(s). For example, the program detector 212, which may be in wired and/or wireless communication with the presentation device 102 and/or the STB 108 of FIG. 1, can identify a presentation time and a source of a presentation. The presentation time and the source identification data may be utilized to identify the program by, for example, cross-referencing a program guide configured, for example, as a look up table. The source identification data may, for example, be the identity of a channel obtained, for example, by monitoring a tuner of the STB 108 or a digital selection (e.g., a remote control signal) of a channel to be presented on the television 102. Additionally or alternatively, codes embedded with or otherwise broadcast with media content being presented via the STB 108 and/or the television 102 may be utilized by the program detector 212 to identify the presentation. As used herein, a code is an identifier that is transmitted with the media content for the purpose of identifying the corresponding media content. Codes may be carried in the audio, in the video, in the metadata, in the vertical blanking interval, or in any other portion of the media content. Additionally or alternatively, the program detector 212 can collect a signature representative of a portion of the media content. As used herein, a signature is a representation of some characteristic of the media content (e.g., a frequency spectrum of an audio signal). Collected signature(s) can be compared against a collection of signatures of known media content to identify the corresponding media content. The signature(s) can be collected by the program detector 212 and/or the program detector 212 can collect samples of the media content and export them to a remote site for generation of the signature(s). Irrespective of the manner in which the media content of the presentation is identified, the identification information is time stamped by the time stamper 208 and stored in the memory 210.

In the illustrated example of FIG. 2, the output device 214 periodically and/or aperiodically exports the recorded data from the memory 214 to a data collection facility via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). The data collection facility utilizes the people data generated by the people counter 206 and the content identifying data collected by the program detector 212 to generate exposure information. Alternatively, the data analysis could be performed locally and exported via a network or the like to a data collection facility for further processing. For example, the amount of people (as counted by the people counter 206) in the exposure environment 100 at a time (as indicated by the time stamp appended to the people tally by the time stamper 208) in which a sporting event (as identified by the program detector 212) was presented by the television 102 can be used in a rating calculation for the sporting event. In some examples, additional information (e.g., demographic data, geographic data, etc.) is correlated with the exposure information at the data collection facility to expand the usefulness of the raw data collected by the example audience measurement device 104 of FIGS. 1 and/or 2. The data collection facility of the illustrated example compiles data from many exposure environments.

While an example manner of implementing the audience measurement device 104 of FIG. 1 has been illustrated in FIG. 2, one or more of the elements, processes and/or devices illustrated in FIG. 2 may be combined, divided, re-arranged, omitted, eliminated and/or implemented in any other way. Further, the example audience detector 200, the example content identifier 202, the example image sensor 204, the example people counter 206, the example time stamper 208 and/or, more generally, the example audience measurement 104 of FIG. 2 may be implemented by hardware, software, firmware and/or any combination of hardware, software and/or firmware. Thus, for example, any of the example audience detector 200, the example content identifier 202, the example image sensor 204, the example people counter 206, the example time stamper 208 and/or, more generally, the example audience measurement 104 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended system or apparatus claims are read to cover a purely software and/or firmware implementation, at least one of the example audience detector 200, the example content identifier 202, the example image sensor 204, the example people counter 206, the example time stamper 208 and/or, more generally, the example audience measurement device 104 of FIG. 2 are hereby expressly defined to include a tangible computer readable medium such as a memory, DVD, CD, etc. storing the software and/or firmware. Further still, the example audience measurement device 104 of FIG. 2 may include one or more elements, processes and/or devices in addition to, or instead of, those illustrated in FIG. 2, and/or may include more than one of any or all of the illustrated elements, processes and devices.

Figure 3:
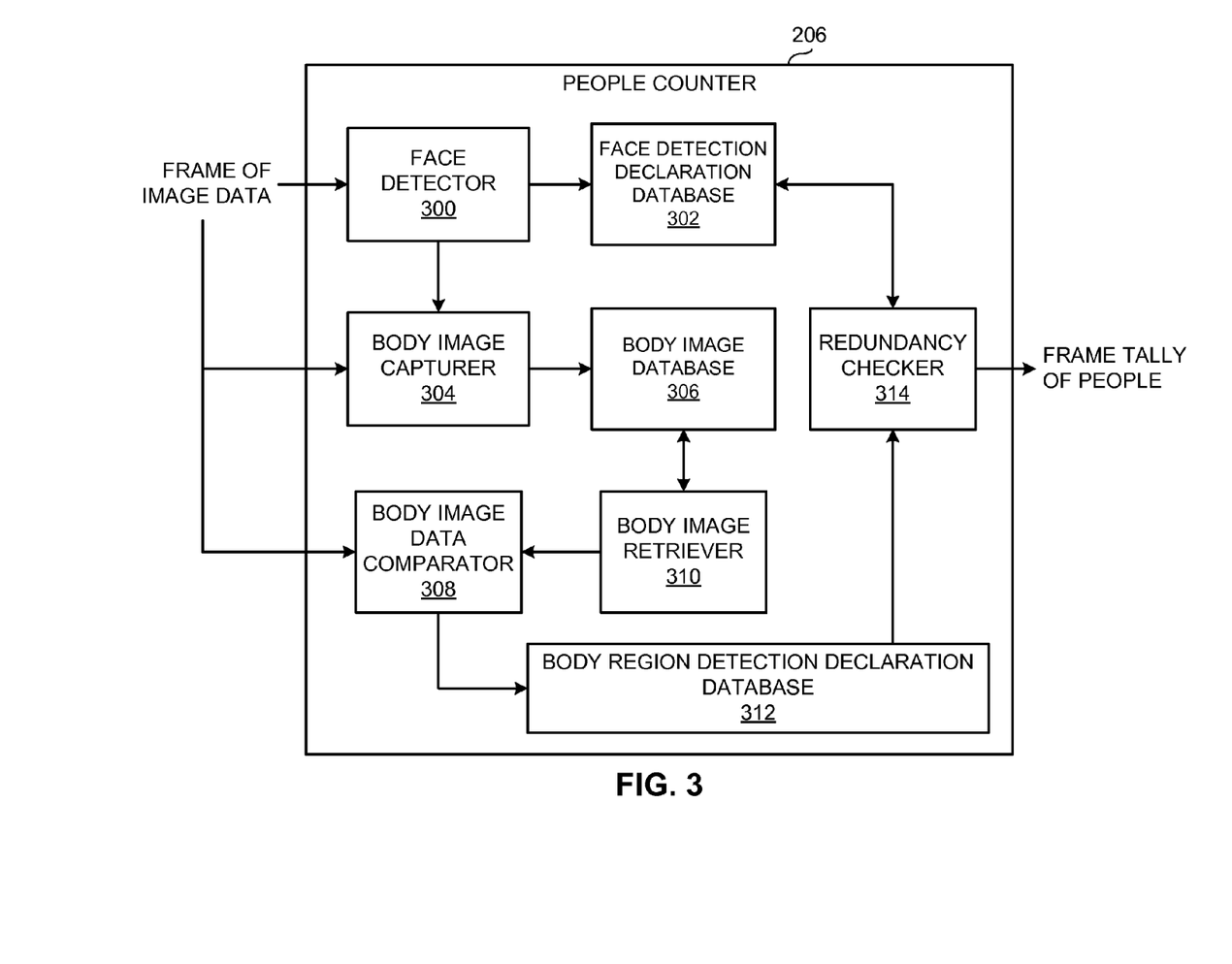
FIG. 3 is a block diagram of an example implementation of the example people counter of FIG. 2.

FIG. 3 is a block diagram of an example implementation of the example people counter 206 of FIG. 2. The example people counter 206 of FIG. 3 includes a face detector 300 that receives frames of image data collected by the image sensor 204 of FIG. 2. With reference to FIG. 1, the example face detector 300 of FIG. 3 receives a frame of image data including objects in the exposure environment 100 of FIG. 1 at a first time. The first time is reflected in a time stamp appended to the image data of the frame by the time stamper 208 of FIG. 2. The example face detector 300 of FIG. 3 analyzes the objects of the frame to determine whether one or more of the objects are faces. In the illustrated example of FIG. 3, the face detector 300 is unconcerned with an identity of a person belonging to detected faces. However, in some examples, the face detector 300 may attempt to identify the person by, for example, comparing image data corresponding to detected face to a collection of images known to belong to identifiable people (e.g., frequent visitors and/or members of the household associated with the room 100 of FIG. 1).

Figure 4A:
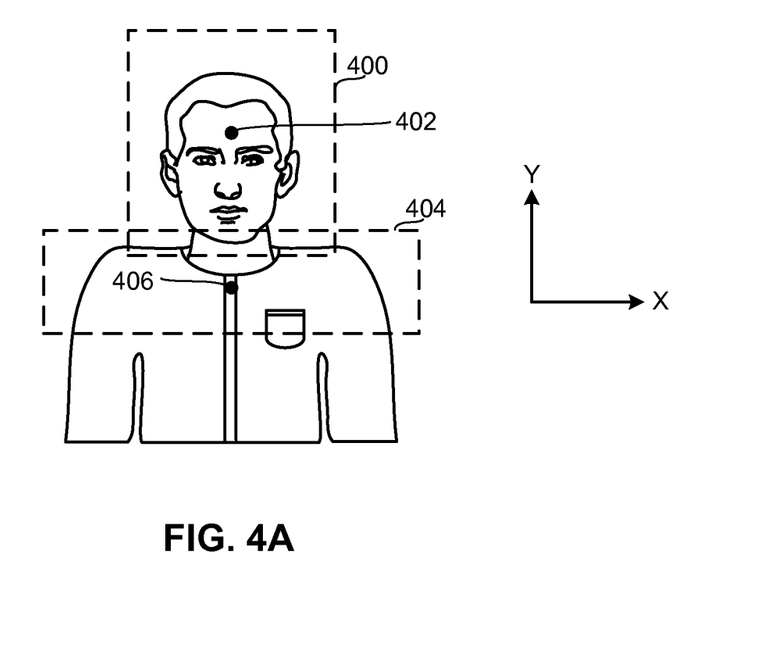
FIG. 4A is a portion of a first frame of image data captured by the example audience measurement device of FIGS. 1 and/or 2.

When a first face is detected in a current frame, the example face detector 300 of FIG. 3 generates a face box or frame (e.g., a square, an oval, a circle, etc.) around the face to demarcate a position in the current frame at which the face is located. FIG. 4A shows an example of a face box 400 generated by the example face detector 300 of FIG. 3. The example face box 400 of FIG. 4A can be centered on a point at a center of the detected face. The example face detector 300 of FIG. 3 also records a position 402 of the detected face. In the illustrated example of FIG. 4, the recorded position 402 is defined by an X-Y coordinate at a center of the face box 400 surrounding the face. The X-Y coordinate corresponds to a two-dimensional grid overlaid on the first frame. In reference to FIG. 1, when the faces of the audience members 106 are oriented towards the camera as shown in FIG. 4A, the example face detector 300 of FIG. 3 detects three faces belonging to the three members of the audience 106 and records (e.g., in a cache associated with the face detector 300) the respective position (e.g., X-Y coordinate) of each detected face. In some instances, the face detector 300 is additionally or alternatively capable of detecting a tilted head or rotated head or a profile view of a head or face. For each detected face, the face detector 300 passes a declaration indicating that a person has been detected and the corresponding position to a face detection declaration database 302. In the illustrated example of FIG. 3, the face detection declarations are implemented by a storage device, such as a cache. That is, the example face detector 300 declares how many faces and, thus, people were detected in the current frame and passes the position (e.g., the X-Y coordinate 402 of FIG. 4A) of each declaration to the face detection declaration database 302. Thus, the example face declaration database 302 of FIG. 3 includes a number of face detections for a current frame and the corresponding positions of the face(s) in the current frame.

The example face detector 300 of FIG. 3 also conveys the position of each detected face to a body image capturer 304. The example body image capturer 304 of FIG. 3 uses the position of each detected face to calculate one or more body regions, such as a shoulder region, a torso region, a leg region, etc. corresponding to each face. That is, the body image capturer 304 estimates a portion of the current frame that includes the designated body region(s) belonging to each detected face. In the illustrated example of FIG. 3, the body image capturer 304 creates a shoulder box or frame (e.g., a rectangle, an oval, etc.) adjacent to and/or overlapping with the face box created around the detected face by the face detector 300. With reference to FIG. 4A, the example body image capturer 304 of FIG. 3 creates a shoulder box 404 partially overlapping with the face box 400 generated by the face detector 300. In some examples, the shoulder box 404 and the face box 400 are adjacent but do not overlap. The example body image capturer 304 of FIG. 3 uses the position 402 of the face box 400 to estimate a location of the shoulders. In particular, the example body image capturer 304 centers the shoulder box 404 at a point along the same Y-axis as the position 402 of the detected face (e.g., mutual alignment with the position 402) and in a negative Y-axis direction relative to the face box 400. The example body image capturer 304 then extends the shoulder box 404 in a positive X-axis and in a negative X-axis direction. The shoulder box 404 is scaled or sized in accordance with a size or scale of the detected face. After the shoulder box is created, the example body image capturer 304 of FIG. 3 records a position of the shoulder box. With reference to the illustrated example of FIG. 4A, the position 406 is a center of the shoulder box 404. The example body image capturer 304 captures image data (e.g., pixels) within the shoulder box 404 in the image frame. In other words, the example body image capturer 304 of FIG. 3 takes a picture of a shoulder region of a person detected via the example face detector 300 and/or extracts image data corresponding to the shoulder region from the image in which the face was detected. In some examples, the image of the shoulder region is captured on a sub-sampled grid spacing to save storage space and to increase processing speed. For example, the image may be sampled at three hundred points spaced in a thirty by ten grid or dispersed evenly throughout the region in accordance with any suitable spatial sampling scheme. The data generated by the body image capturer 304, including the image data (e.g., pixels) of the shoulder region and the position 406 of the picture, is stored in a database 306. The example database 306 of body region images can be implemented by any suitable type of data structure, memory, and/or data storage device. As described below, additional or alternative body region(s) can be captured by the body image capturer 304 based on, for example, adjustable settings that control which body region(s) are to be used to count people in accordance with the examples disclosed herein.

As noted above, a tilt or rotation of a head is not likely to substantially change the orientation and/or position of a body region, such as the shoulder region. The example people counter 206 of FIG. 3 takes advantage of this likelihood to avoid missing a titled or rotated head when counting people by recognizing objects as faces. In particular, the example people counter 206 of FIG. 3 includes a body image data comparator 308 to supplement the face detector 300 as a tool for counting people in the exposure environment 100. The example body image data comparator 308 of FIG. 3 compares image data of a current frame to body region pictures of one or more previous or subsequent frames. If the body image data comparator 308 determines that the body regions captured in the previous or subsequent frame(s) are also present in the current frame, a person is determined to be in the current frame (and, thus, counted) even when a corresponding face is not detected (e.g., because the face is unrecognizable by and/or obscured from the camera 110). In some examples, the body image data comparator 308 is triggered by a face detected in a frame not being detected in subsequent or previous frame. In some examples, the body image data comparator 308 operates regardless of whether faces of a frame are found in a subsequent or previous frame.

To obtain body region pictures of the previous frame(s), the example people counter 206 of FIG. 3 includes a body image retriever 310. The example body image retriever 310 retrieves a number of previous frames to be compared to the current frame by the body image data comparator 308. For example, to have the body image data comparator 308 compare the current frame to body region images of the previous ten (10) frames (which may translate to the ten seconds prior to the current frame in the exposure environment 100 of FIG. 1), the example body image retriever 310 of FIG. 3 retrieves body region image(s) and the corresponding position(s) for the previous ten (10) frames from the body region images database 306 and conveys the same to the body image data comparator 308 (e.g., as a group or sequentially). The example body image retriever 310 can be adjusted such that a greater or lesser number of previous frames are compared to the current frame.

Figure 4B:
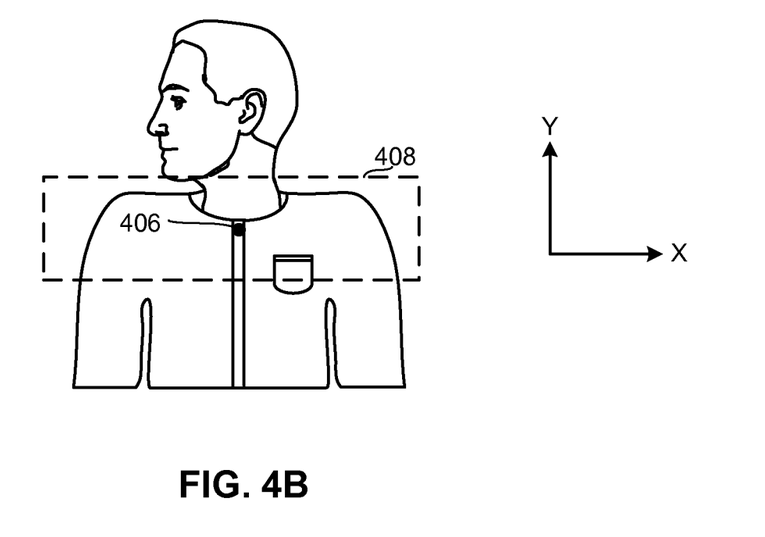
FIG. 4B is a portion of a second frame of image data captured by the example audience measurement device of FIGS. 1 and/or 2.

The example body image data comparator 308 of FIG. 3 analyzes the image data of the current frame at each position received from the body image retriever 310. In particular, the example body image data comparator 308 of FIG. 3 compares the image data of the current frame corresponding to the shoulder box 404 to the shoulder image(s) of the previous or subsequent frame(s) at those position(s). With reference to FIGS. 4A and 4B, when a current frame corresponding to FIG. 4B is to be compared to a previous frame corresponding to FIG. 4A, the example body image retriever 310 retrieves the shoulder image 404 at the position 406 of FIG. 4A from the body image database 306 and conveys the same to the body image data comparator 308. The example body image data comparator 308 of FIG. 3 uses the received position 406 from FIG. 4A as a center of a box 408 for comparing to the received shoulder image data. The box 408 used by the example body image data comparator 308 is similarly shaped and sized as the shoulder box 404 formed by the example body image capturer 304 in connection with FIG. 4A. Therefore, if the received shoulder image data of the box 404 from the previous frame (e.g., FIG. 4A) is substantially the same as (e.g., within a similarity threshold) the image data in the box 408 used by the body image data comparator 308, the example people counter 206 determines that a person appears in the current frame at the position 406 even though a face was not detected. To determine whether the image data is substantially the same, the example comparator 308 of FIG. 3 utilizes a similarity threshold defined by, for example, an amount of similar pixels in a similar position within the boxes 404 and 408. Additionally or alternatively, the example comparator 308 of FIG. 3 may utilize any other suitable comparison technique(s) such as, for example, a normalized correlation method, a Mahalanobis distance, etc. when comparing the pixels of the boxes 404 and 408. As shown in FIG. 4B, the face was not detected by the face detector 300 because the head is rotated to one side. However, the image data of the shoulder boxes 404 and 408 are similar Therefore, a person belonging to the shoulders is assumed to appear in the current frame in a similar position as the same person in the previous frame. Accordingly, the example people counter 206 counts the person associated with the shoulder even though a face was not detected and, thus, does not undercount a people tally when a person tilts or rotates his or her head (as shown between FIGS. 4A and 4B) but remains in the exposure environment 100.

Figure 4C:
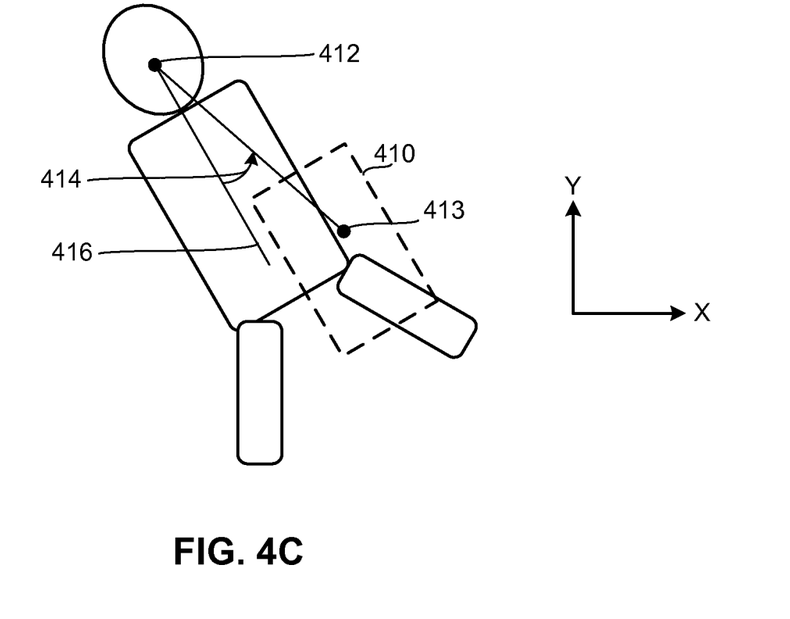
FIG. 4C is a portion of a third frame of image data captured by the example audience measurement device of FIGS. 1 and/or 2.

In addition or in lieu of the shoulder region described above, the example body image capturer 304 of FIG. 3 may capture other body region(s) relative to a detected face or head. FIG. 4C illustrates an alternative body region that can be captured by the body image capturer 304 and analyzed by the body image data comparator 308. Similar to the shoulder region described above in connection with FIGS. 4A and 4B, a hip region 410 can be captured by the body image capturer 304 based on a position 412 of a detected head. In the illustrated example, the body image capturer 304 is configured to use the hip region 410 (or any other suitable body region alternative to the shoulder region described above) when the detected face corresponds to a tilted head detected by a detector configured to detect profiles of a head. In the example of FIG. 4C, a position 413 of the hip region 410 and the orientation of the hip region 410 is calculated using an angle 414 relative to a centerline of extending from the tilted head and a distance 416 from the position 412 of the head. The captured hip region 410 of FIG. 4C can be compared to other hip regions of the body image database 306 by the body image data comparator 308 in a similar manner as the shoulder region described above. Any other suitable body region can be utilized by the example people counter 206 of FIGS. 2 and/or 3.

The example body image data comparator 308 of FIG. 3 performs the comparison described above for each body region box and position received from the body image retriever 310. For each matching body region between the current frame and the previous or subsequent frame(s), the example body image data comparator 308 forwards the corresponding position (e.g., the position 406 of FIGS. 4A and 4B) and a declaration that a person appears in the current frame at that position to a body region detection declaration database 312. That is, the example body image data comparator 308 declares how many body regions similar to previously detected body regions were detected in the current frame and passes the position (e.g., the X-Y coordinate 406) of each declaration to the body region detection declaration database 312. Thus, the example declaration database 312 of FIG. 3 includes a number of body region detections for a current frame and the corresponding positions of the body regions in the current frame. In the illustrated example, the body region detection declaration database 312 is implemented by a storage device, such as a cache.

In some examples, the database 312 can be used to generate a tally of the people in exposure environment 100 for a given frame. In such instances, the people counter 206 outputs the number of body region detections for a current frame as a people tally for that frame. However, in the illustrated example of FIG. 3, the people counter 206 includes a redundancy checker 314 to avoid counting a single person appearing in a frame multiple times. Instead of using the body region declarations as the people tally for a particular frame, the example redundancy checker 314 of FIG. 3 determines whether a person is counted in both the face detection declaration database 302 and the body region detection declaration database 312. The example redundancy checker 314 of FIG. 3 compares a position of each of the body region declarations to the positions of the face declarations for that same time frame. When a position of a first body region declaration (e.g., the position 406 of FIG. 4B) and a position of any of the face declarations (e.g., the position 402 of FIG. 4A) indicate that the first body region declaration corresponds to an already detected face, the example redundancy checker 314 omits the first body region declaration from a people tally for the current frame. Such an indication may be the position of the first body region declaration being located on a substantially similar (e.g., within a threshold of plus or minus five units) X-axis as the position of a first face declaration and a certain amount of Y-units away from the position of the first face declaration. In such instances, the amount of Y-units used by the redundancy checker 314 corresponds to a number of Y-units away from the center of the face box used by the body image capturer 304 to generate, for example, the shoulder box 404 of FIG. 4A.

After factoring in omission(s) from the redundancy check described above, the redundancy checker 314 sums the face declarations and the body region declarations for the current frame and outputs the total as a people tally. As described above, the people tally is conveyed to the time stamper 208 of FIG. 2 and, subsequently, to the memory 210 of FIG. 2. Thus, the example people counter 206 of FIG. 3 provides the example audience measurement device 104 of FIGS. 1 and/or 2 a more accurate amount of people in the exposure environment 100 at a given time. People tallies may be generated at any desired frequency (e.g., once per second, once per five seconds, etc.).

While an example manner of implementing the people counter 206 of FIG. 2 has been illustrated in FIG. 3, one or more of the elements, processes and/or devices illustrated in FIG. 3 may be combined, divided, re-arranged, omitted, eliminated and/or implemented in any other way. Further, the example face detector 300, the example face detection declaration database 302, the example body image capturer 304, the example body image database 306, the example body image comparator 308, the example body image retriever 310, the example body region detection declaration database 312, the example redundancy checker 314, and/or, more generally, the example people counter 206 of FIG. 3 may be implemented by hardware, software, firmware and/or any combination of hardware, software and/or firmware. Thus, for example, any of, the example face detector 300, the example face detection declaration database 302, the example body image capturer 304, the example body image database 306, the example body image comparator 308, the example body image retriever 310, the example body region detection declaration database 312, the example redundancy checker 314, and/or, more generally, the example people counter 206 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of, the example face detector 300, the example face detection declaration database 302, the example body image capturer 304, the example body image database 306, the example body image comparator 308, the example body image retriever 310, the example body region detection declaration database 312, the example redundancy checker 314, and/or, more generally, the example people counter 206 of FIG. 3 are hereby expressly defined to include a tangible computer readable medium such as a memory, DVD, CD, etc. storing the software and/or firmware. Further still, the example people counter 206 of FIG. 3 may include one or more elements, processes and/or devices in addition to, or instead of, those illustrated in FIG. 3, and/or may include more than one of any or all of the illustrated elements, processes and devices.

FIGS. 5A-5C and 6 are flowcharts representative of example machine readable instructions for implementing the example people counter 206 of FIGS. 2 and/or 3. In this example, the machine readable instructions comprise a program for execution by a processor such as the processor 712 shown in the example processing system 700 discussed below in connection with FIG. 7. The program may be embodied in software stored on a tangible computer readable medium such as a CD-ROM, a floppy disk, a hard drive, a digital versatile disk (DVD), or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5A-5C and 6, many other methods of implementing the example people counter 206 may alternatively be used. For example, the order of execution of the blocks may be changed, and/or some of the blocks described may be changed, eliminated, or combined.

As mentioned above, the example processes of FIGS. 5A-5C and/or 6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5A-5C and/or 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 5A:
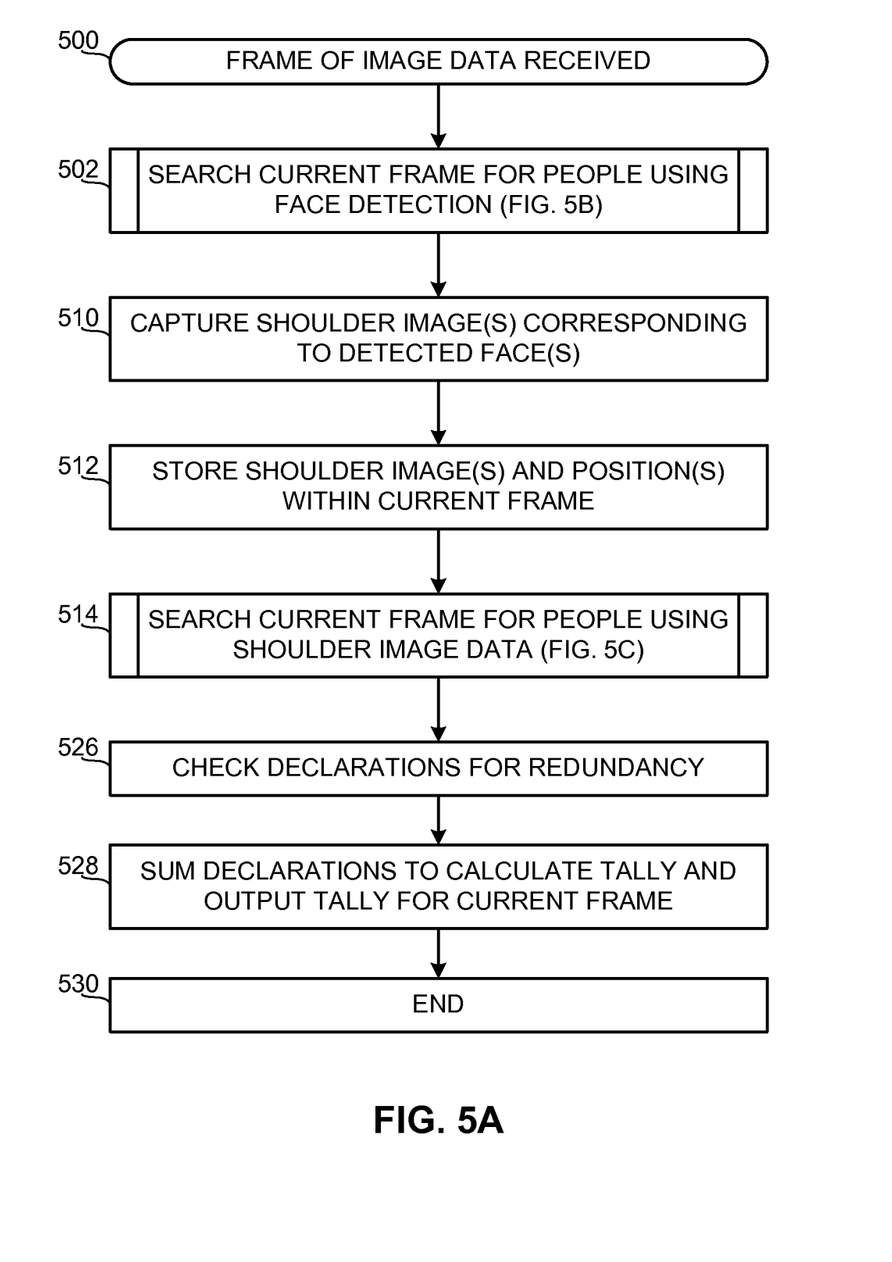
FIGS. 5A-5C are flowcharts illustrating example machine readable instructions that may be executed to implement the example people counter of FIGS. 1, 2 and/or 3.
Figure 5B:
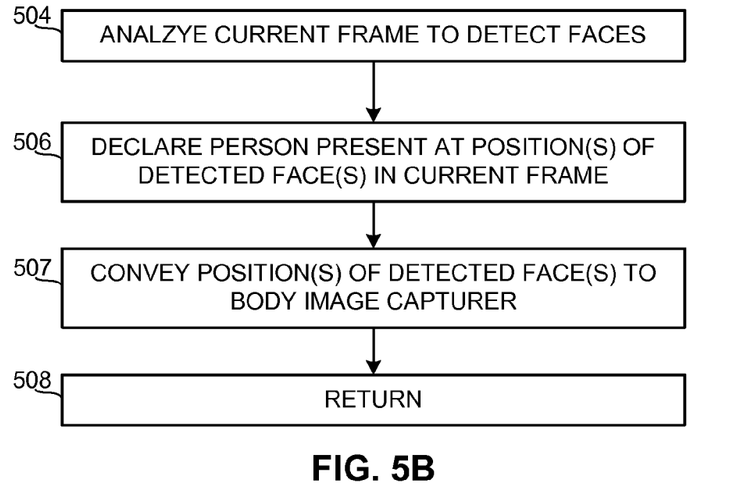

FIG. 5A begins with the example people counter 206 of FIG. 3 receiving a frame of image data (block 500). In the illustrated example, the received frame is captured by the camera 110 of the audience measurement device 104 monitoring the exposure environment 100. The example people counter 206 searches the received frame for faces to attempt to count the members of the audience 106 (block 502). An example implementation of block 502 is shown in FIG. 5B. As an initial count of the people in the frame, the example face detector 300 of FIG. 3 analyzes objects of the received frame to determine whether any of the object(s) is a human face (block 504). For any detected faces, the example face detector 300 declares that a person is present at a position (e.g., an X-Y coordinate) recorded by the face detector 300 (block 506). Thus, each declaration of a presence of a person by the face detector 300 results in an entry in the face detection declaration database 302 of FIG. 3. Such entries also include the position of the detected face as determined by the face detector 300. The example face detector 300 also conveys the position of each detected face in the received frame to the example body image capturer 304 (block 507). Control then returns to FIG. 5A (block 508).

The example body image capturer 304 uses the position(s) of the detected face(s) to capture image data in a body region for each detected face (block 510). The body region to be captured in the illustrated example of FIGS. 5A-5C and 6 is a shoulder region for clarity. However, any suitable body region can be utilized by the examples of FIGS. 5A-5C and/or 6. To capture a first shoulder image for a first detected face, the body image capturer 304 of the illustrated example identifies a box or area (e.g., a square) adjacent to the position of the first detected face likely to include the shoulders belonging to the first detected face. A center of the area is set by traversing along a Y-axis in a negative direction away from the X-Y coordinate of the received position of the corresponding detected face (e.g., a center of the box defining the object detected as a face). The area then extends in a positive and a negative direction along an X-axis away from the calculated center of the area. An example area identified by the body image capturer 304 is shown in FIG. 4A as box 404. Image data (e.g., pixel information) of the shoulder area is captured by the body image capturer 304 and stored, along with the corresponding position data (e.g., the center) in the body images database 306 (block 512).

Figure 5C:
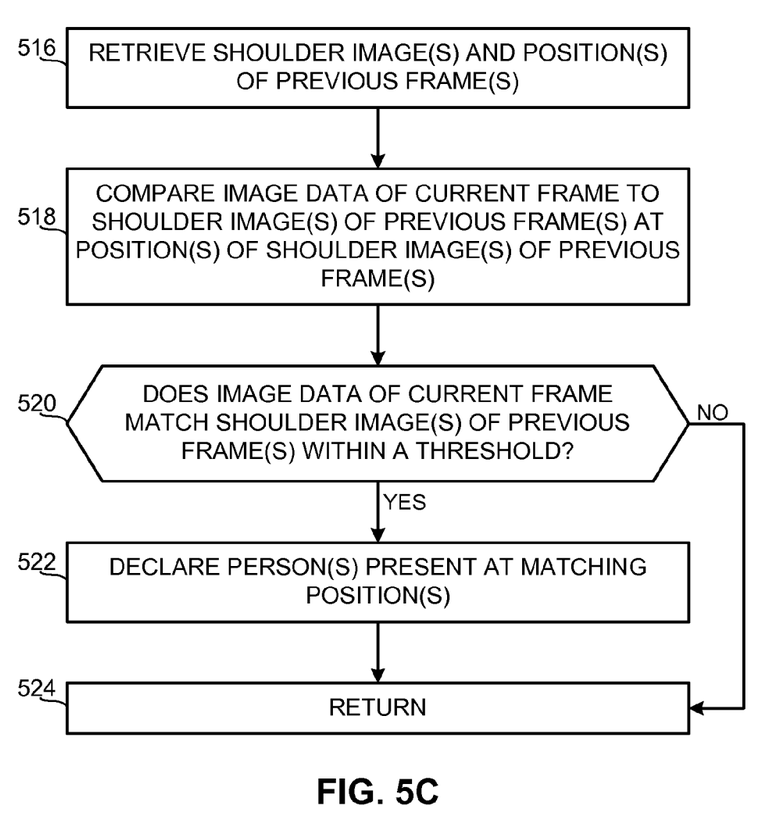

The example people counter 206 of FIG. 3 then searches the received frame for people using the body image data stored in the database base 306 (block 514). An example implementation of block 514 is shown in FIG. 5C. The example body image retriever 310 retrieves shoulder image data for one or more previous frame(s) of the media exposure environment 100 captured by the camera 110 (block 516). For example, the body image retriever 310 of the illustrated example retrieves shoulder image data for the last ten (10) frames captured by the camera 110 (e.g., the last ten (10) seconds). In the illustrated example, a position for each of the retrieved shoulder images accompanies the image data retrieved by the body image retriever 310. The body image retriever 310 conveys (e.g., as a batch or one by one) the retrieved data, including the position(s) of the shoulder image(s) of the previous frame(s), to the body image data comparator 308. In the example of FIG. 5C, the body image data comparator 308 compares image data of the current frame at the position(s) of the received shoulder image(s) to the received shoulder image(s) from the previous frame(s) (block 518). If the image data of the current frame at the received position(s) matches at least a threshold number of the shoulder image data of the previous frame(s) (e.g., any of the ten frames) within a threshold (block 520), the example body image data comparator 308 declares that a person appears in the current frame at the respective position (block 522). In the illustrated example, the declaration(s) of the body image data comparator 308 are stored in the body region detection declaration database 312. Control then returns to FIG. 5A (block 524).

The example redundancy checker 314 of FIG. 3 compares a position of each of the shoulder declarations to the positions of the face declaration for a corresponding time frame (block 526). When a position of one of the shoulder declarations and a position of one of the face declarations indicate that the shoulder declaration corresponds to an already detected face, the example redundancy checker 314 omits that shoulder declaration from a people tally for the current frame. After identifying redundancies between the face declarations and the shoulder declarations, the example redundancy checker 314 sums the non-redundant face and shoulder declarations corresponding to people appearing in the current frame and outputs a tally representing the sum total of people in the audience of the exposure environment 100 of FIG. 1 (block 528). The example instructions represented by the flowchart of FIG. 5A then end or return to block 502 to process another frame (block 530).

Figure 6:
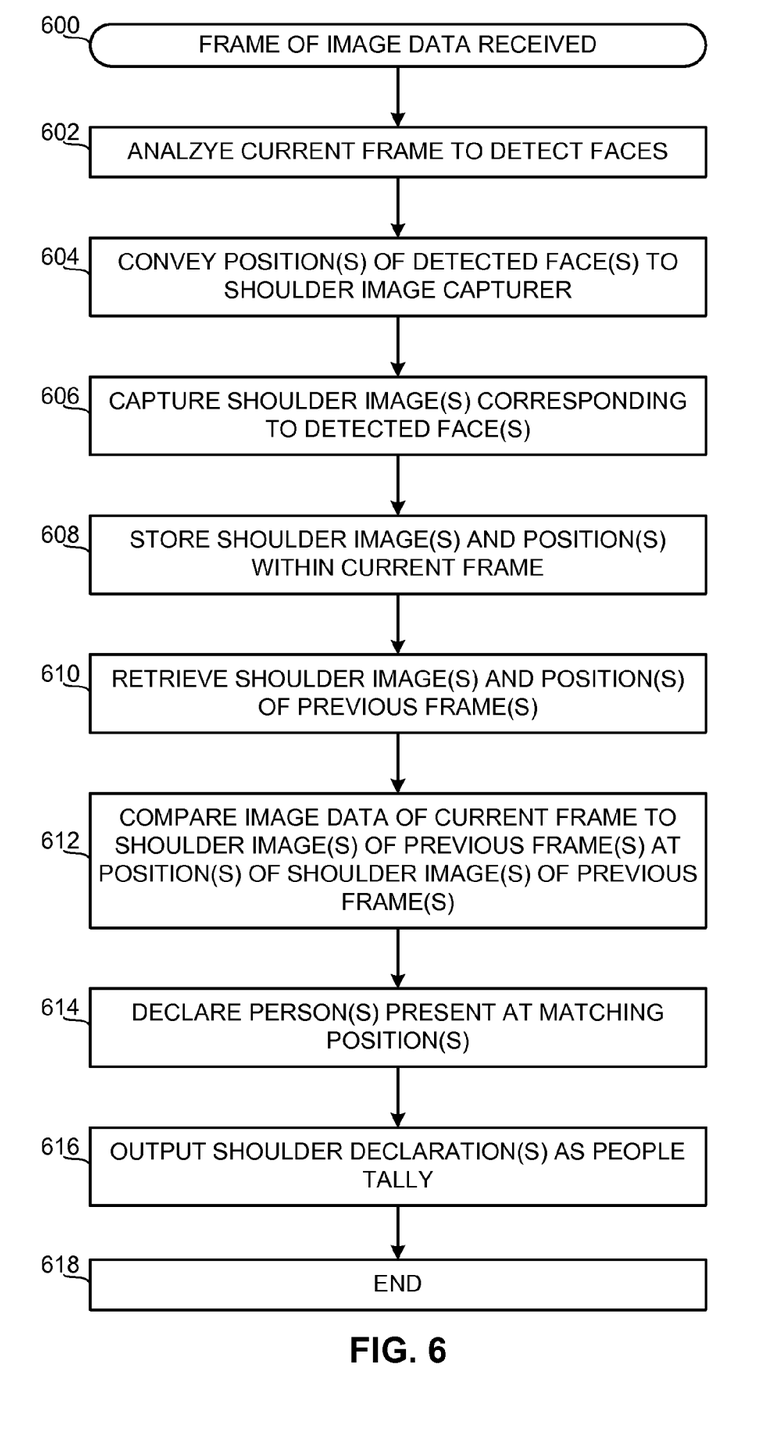
FIG. 6 is a flowchart illustrating example machine readable instructions that may be executed to implement the example people counter of FIGS. 1, 2 and/or 3.

FIG. 6 is a flowchart illustrating another example implementation of the people counter 206 in addition to the example implementation illustrated in FIGS. 5A-5C. In the illustrated example of FIG. 6, the shoulder detection declarations are used as a people tally without checking for redundancies between the face detection declarations and the shoulder detection declarations described above. Such an approach may, for example, conserve processing resources and/or time in comparison with the example implementation described in FIGS. 5A-5C. FIG. 6 begins with the example people counter 206 of FIG. 3 receiving a frame of image data (block 600). In the illustrated example, the received frame is captured by the camera 110 of the audience measurement device 104 monitoring the exposure environment 100. The example people counter 206 analyzes the current frame to detect human faces (block 602). For any detected faces, the example face detector 300 detects the position of the detected face and conveys the position of each detected face in the current frame to the example body image capturer 304 (block 604).

The example body image capturer 304 uses the position(s) of the detected face(s) to capture image data in a shoulder region for each detected face (block 606). For example, to capture a first shoulder image for a first detected face, the body image capturer 304 of the illustrated example identifies a box or area (e.g., a square) adjacent to the position of the first detected face likely to include the shoulders belonging to the first detected face. Image data (e.g., pixel information) of the shoulder area is captured by the body image capturer 304 and stored, along with the corresponding position data (e.g., the center) in the body images database 306 (block 608).

In the illustrated example of FIG. 6, the example body image retriever 310 retrieves shoulder image data for one or more previous frame(s) of the media exposure environment 100 captured by the camera 110 (block 610). For example, the body image retriever 310 of the illustrated example retrieves shoulder image data for the last ten (10) frames captured by the camera 110 (e.g., the last ten (10) seconds). In the illustrated example of FIG. 6, a position for each of the retrieved shoulder images accompanies the image data retrieved by the body image retriever 310. The body image retriever 310 conveys (e.g., as a batch or one by one) the retrieved data, including the position(s) of the shoulder image(s) of the previous frame(s), to the body image data comparator 308. In the example of FIG. 5C, the body image data comparator 308 compares image data of the current frame at the position(s) of the received shoulder image(s) to the received shoulder image(s) from the previous frame(s) (block 612). If the image data of the current frame at the received position(s) matches at least a threshold number of the shoulder image data of the previous frame(s) (e.g., any of the ten frames) within a threshold, the example body image data comparator 308 declares that a person appears in the current frame at the respective position (block 614). In the illustrated example, the declaration(s) of the body image data comparator 308 are stored in the body region detection declaration database 312. Further, the declaration(s) of the body image data comparator 308 are output as a people tally for the current frame (block 616). Thus, using the illustrated example of FIG. 6, the number of matching shoulder regions between a current frame and a previous frame is output by the people counter 206 as a people tally. The example of FIG. 6 then ends (block 618).

While the example people counter 206 of FIGS. 2 and/or 3 is described in the context of an audience measurement device 104 and the generation of exposure data for media content, the example methods, articles of manufacture, and apparatus disclosed herein can be applied to additional or alternative contexts, systems, measurements, applications, programs, etc. That is, the example methods, articles of manufacture, and apparatus disclosed herein can be used in any application to determine how many people are located in a space or location.

Figure 7:
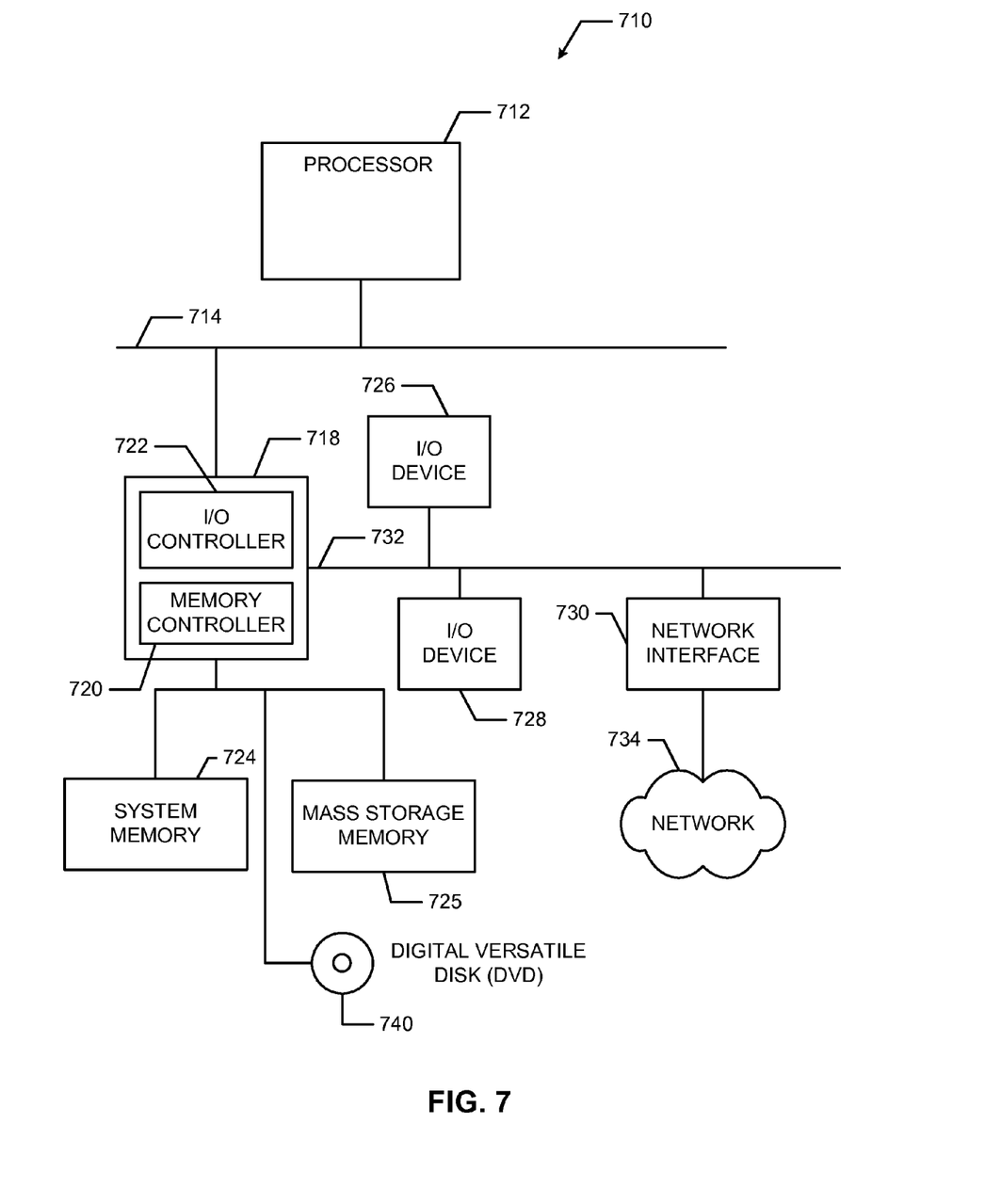
FIG. 7 is a block diagram of an example processing system capable of executing the example machine readable instructions of FIGS. 5A-5C and/or 6 to implement the example people counter of FIGS. 1, 2 and/or 3.

FIG. 7 is a block diagram of an example processor system 710 that may be used to execute the machine readable instructions of FIGS. 5A-5C to implement the example people counter 206 of FIGS. 2 and/or 3.

The example processor system 710 of FIG. 7 includes a processor 712 that is coupled to an interconnection bus 714. The processor 712 may be any suitable processor, processing unit, or microprocessor (e.g., one or more Intel® microprocessors from the Pentium® family, the Itanium® family or the XScale® family and/or other processors from other families). The system 710 may be a multi-processor system and, thus, may include one or more additional processors that are identical or similar to the processor 712 and that are communicatively coupled to the interconnection bus 714.

The processor 712 of FIG. 7 is coupled to a chipset 718, which includes a memory controller 720 and an input/output (I/O) controller 722. A chipset provides I/O and memory management functions as well as a plurality of general purpose and/or special purpose registers, timers, etc. that are accessible or used by one or more processors coupled to the chipset 718. The memory controller 720 performs functions that enable the processor 712 to access a system memory 724, a mass storage memory 725, and/or a digital versatile disk (DVD) 740.

In general, the system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc. The machine readable instructions of FIGS. 5A-5C may be stored in the system memory 724, the mass storage memory 725, and/or the DVD 740.

The I/O controller 722 performs functions that enable the processor 712 to communicate with peripheral input/output (I/O) devices 726 and 728 and a network interface 730 via an I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode (ATM) device, an 802.11 device, a digital subscriber line (DSL) modem, a cable modem, a cellular modem, etc. that enables the processor system 710 to communicate with another processor system. The example network interface 730 of FIG. 7 is also communicatively coupled to a network 734, such as an intranet, a Local Area Network, a Wide Area Network, the Internet, etc.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method to count people, comprising:
   capturing an image of a body region in a first frame;
   when a second frame different from the first frame includes the image of the body region, incrementing a first count of persons in the second frame; and
   counting a number of faces in the second frame to form a second count.

2. A method as defined in claim 1, wherein the image is captured in response to a detection of a face corresponding to the body region.

3. A method as defined in claim 1, further comprising storing the image in association with a position of the image in the first frame.

4. A method as defined in claim 1, further comprising comparing a portion of the second frame and the image of the body region to determine if the second frame includes the image.

5. A method as defined in claim 1, further comprising determining if a body region counted in the second frame corresponds to a face counted in the second count; and
   reducing the first count if the body region corresponds to the face counted in the second count.

6. A method as defined in claim 1, further comprising summing the first count and the second count to obtain a tally of people in the second frame.

7. A method as defined in claim 6, further comprising associating the tally with media.

8. An apparatus to count people, comprising:
a face detector to detect faces in a first frame and to increment a face tally associated with the first frame based on a number of faces detected in the first frame;
a body image capturer to collect an image of a body region adjacent to a detected face from a second frame different from the first frame; and
a comparator to compare image data of the first frame to the image of the body region from the second frame, and to increment a body region count associated with the first frame when the image data of the first frame matches the image of the body region from the second frame, wherein at least one of the face detector, the body image capturer, or the comparator is implemented via a logic circuit.

9. An apparatus as defined in claim 8, further comprising a redundancy checker to check for redundancy between the body region count associated with the first frame and the face tally associated with the first frame.

10. An apparatus as defined in claim 9, wherein the redundancy checker is to decrement the body region count when the redundancy checker detects the redundancy.

11. An apparatus as defined in claim 9, wherein the redundancy checker is to sum the face tally and the body region count to form a people tally.

12. An apparatus as defined in claim 11, further comprising a content identifier to associate the people tally with media identifying information corresponding to media associated with the first frame.

13. An apparatus as defined in claim 8, wherein a location of the body region is based on a position of the adjacent face.

14. An apparatus as defined in claim 13, wherein the position is a coordinate of a grid overlaid on the first and second frames.

15. A tangible computer readable medium comprising instructions that, when executed, cause a machine to at least:
detect a first face in a first frame corresponding to a first time;
capture an image of a region adjacent the first face in the first frame, the region being at a first position within the first frame;
determine whether a second frame corresponding to a second time includes the image at the first position; and
increment a people tally associated with the second frame when the second frame includes the image at the first position and the detected face of the first frame is not detected in the second frame.

16. A computer readable medium as defined in claim 15, the instructions to cause the machine to associate the people tally with media being presented at the second time.

17. A computer readable medium as defined in claim 15, wherein the region adjacent the first face is calculated by generating a box based on a reference point of the detected first face.

18. A computer readable medium as defined in claim 15, the instructions to cause the machine to determine that the second frame includes the image at the first position when the second frame includes image data similar within a threshold to the image of the region adjacent the first face at the first position.

* * * * *